(12) United States Patent
Capodieci

(10) Patent No.: US 6,635,292 B2
(45) Date of Patent: Oct. 21, 2003

(54) ULTRASONIC ROTARY FORMING OF FOOD PRODUCTS

(75) Inventor: Roberto A. Capodieci, Glen Ellyn, IL (US)

(73) Assignee: Mars, Incorporated, McLean, VA (US)

( * ) Notice: Subject to any disclaimer, the term of this patent is extended or adjusted under 35 U.S.C. 154(b) by 39 days.

(21) Appl. No.: 10/046,329

(22) Filed: Oct. 26, 2001

(65) Prior Publication Data

US 2003/0082283 A1 May 1, 2003

(51) Int. Cl.$^7$ .............................. A23G 7/00; A23P 1/00
(52) U.S. Cl. ................. 426/238; 99/451; 425/174.2; 425/237; 425/408; 426/512; 426/515
(58) Field of Search ................. 426/238, 512, 426/515, 600; 425/174.2, 237, 408; 99/451

(56) References Cited

U.S. PATENT DOCUMENTS

| | | |
|---|---|---|
| 2,145,941 A | 2/1939 | Maxfield |
| 3,029,751 A | 4/1962 | Gilmore |
| 3,031,804 A | 5/1962 | Thatcher et al. |
| 3,044,510 A | 7/1962 | Schneider et al. |
| 3,114,643 A | 12/1963 | Boston et al. |
| 3,199,437 A | 8/1965 | Nelsen |
| 3,407,077 A | 10/1968 | Helin |
| 3,416,398 A | 12/1968 | Bodine |
| RE26,543 E | 3/1969 | Beeson et al. |
| 3,434,906 A | 3/1969 | De Greeve et al. |
| 3,505,136 A | 4/1970 | Attwood |
| 3,615,712 A | 10/1971 | Keller |
| 3,636,859 A | 1/1972 | Null |
| 3,819,089 A | 6/1974 | Scales |
| 3,829,007 A | 8/1974 | Ellison |
| 3,830,944 A | 8/1974 | Dimitriadis et al. |
| 3,873,735 A | 3/1975 | Chalin et al. |
| 3,895,118 A | 7/1975 | Rambold |
| 3,961,089 A | 6/1976 | Dogliotti |
| 3,971,838 A | 7/1976 | Yazawa |

(List continued on next page.)

FOREIGN PATENT DOCUMENTS

| | | |
|---|---|---|
| AT | 382 112 B | 1/1987 |
| DE | 29 22 834 A1 | 12/1980 |

(List continued on next page.)

*Primary Examiner*—George C. Yeung
(74) *Attorney, Agent, or Firm*—McAndrews, Held & Malloy, Ltd.

(57) ABSTRACT

A system and method of ultrasonic rotary forming food products is provided. The system includes a first ultrasonically activated rotary wheel including a first cavity for receiving a food product and a second rotary wheel. The first ultrasonically activated rotary wheel and said second rotary wheel rotate such that food product within the first cavity contacts the second rotary wheel to form an individually-formed food product. The food product passes from the first cavity to form a single formed food product. The system also includes a food product delivery system for delivering food product to the first ultrasonically activated rotary wheel and the second rotary wheel. The second rotary wheel may also be an ultrasonically activated rotary wheel having cavities formed on the outer circumferential edge of the wheel. The food product delivery system may include a single food product delivery tube that simultaneously delivers food product from the same stream, droplet, or line to both rotary wheels. Alternatively, the food product delivery system may include a first hollow tube delivering food product to the first rotary wheel and a second hollow tube delivering food product to the second rotary wheel.

47 Claims, 3 Drawing Sheets

U.S. PATENT DOCUMENTS

| | | |
|---|---|---|
| 4,017,237 A | 4/1977 | Webster |
| 4,055,109 A | 10/1977 | Kan |
| 4,097,327 A | 6/1978 | Calemard |
| 4,115,489 A | 9/1978 | Macfee |
| 4,163,768 A | 8/1979 | Stephens |
| 4,216,639 A | 8/1980 | Gautier |
| 4,290,521 A | 9/1981 | Mitchell |
| 4,358,466 A | 11/1982 | Stevenson |
| 4,361,235 A | 11/1982 | Gautier |
| 4,373,982 A | 2/1983 | Kreager et al. |
| 4,394,395 A | 7/1983 | Rostagno et al. |
| 4,421,773 A | 12/1983 | Akutagawa |
| 4,453,370 A | 6/1984 | Titchenal |
| 4,500,280 A | 2/1985 | Astier et al. |
| 4,514,426 A | 4/1985 | Jordan et al. |
| 4,517,790 A | 5/1985 | Kreager |
| 4,521,467 A | 6/1985 | Berger |
| 4,534,726 A | 8/1985 | Simelunas |
| 4,534,818 A | 8/1985 | Kreager et al. |
| 4,574,566 A | 3/1986 | Eaves et al. |
| 4,601,157 A | 7/1986 | Adelman |
| 4,605,123 A | 8/1986 | Goodrum et al. |
| 4,608,261 A | 8/1986 | MacKenzie |
| 4,616,470 A | 10/1986 | Nakamura |
| 4,631,901 A | 12/1986 | Chung et al. |
| 4,651,870 A | 3/1987 | Giambalvo |
| 4,652,456 A | 3/1987 | Sailsbury |
| 4,663,915 A | 5/1987 | Van Erden et al. |
| 4,663,917 A | 5/1987 | Taylor et al. |
| 4,685,602 A | 8/1987 | Hama |
| 4,693,056 A | 9/1987 | Raszewski |
| 4,735,753 A | 4/1988 | Ackermann |
| 4,751,916 A | 6/1988 | Bory |
| 4,759,170 A | 7/1988 | Sawa et al. |
| 4,759,249 A | 7/1988 | Held |
| 4,774,797 A | 10/1988 | Colamussi et al. |
| 4,784,591 A | 11/1988 | Ackermann |
| 4,787,755 A | 11/1988 | Branson |
| 4,796,300 A | 1/1989 | Branson |
| 4,810,109 A | 3/1989 | Castel |
| 4,849,233 A | 7/1989 | Hemker |
| 4,864,802 A | 9/1989 | D'Angelo |
| 4,865,680 A | 9/1989 | Pierson |
| 4,879,124 A | 11/1989 | Oberle |
| 4,890,439 A | 1/1990 | Smart et al. |
| 4,909,870 A | 3/1990 | Gould et al. |
| 4,923,701 A | 5/1990 | VanErden |
| 4,937,410 A | 6/1990 | Anderson |
| 4,950,859 A | 8/1990 | Anderson |
| 5,044,777 A | 9/1991 | Watkins et al. |
| 5,058,364 A | 10/1991 | Seiden et al. |
| 5,061,331 A | 10/1991 | Gute |
| 5,067,302 A | 11/1991 | Boeckmann |
| 5,161,350 A | 11/1992 | Nakamura |
| 5,181,365 A | 1/1993 | Garvey et al. |
| 5,202,064 A | 4/1993 | Furusawa et al. |
| 5,222,813 A | 6/1993 | Kopp et al. |
| 5,226,343 A | 7/1993 | Rawson et al. |
| 5,228,372 A | 7/1993 | Harrop et al. |
| 5,230,761 A | 7/1993 | Crawford |
| 5,342,634 A | 8/1994 | Murata et al. |
| 5,358,727 A * | 10/1994 | Yates et al. .................. 426/512 |
| 5,366,741 A | 11/1994 | Van Der Zon |
| 5,391,387 A | 2/1995 | Peters |
| 5,419,437 A | 5/1995 | Huseman |
| 5,435,712 A | 7/1995 | Probst |
| 5,437,215 A | 8/1995 | Hamilton |
| 5,552,165 A | 9/1996 | Haak et al. |
| 5,645,681 A | 7/1997 | Gopalakrishna et al. |
| 5,667,824 A | 9/1997 | Ream et al. |
| 5,689,942 A | 11/1997 | Suga |
| 5,694,745 A | 12/1997 | Spatafora et al. |
| 5,706,635 A | 1/1998 | Simmons |
| 5,733,587 A | 3/1998 | Ream et al. |
| 5,752,423 A | 5/1998 | Rawson |
| 5,819,615 A | 10/1998 | Dale et al. |
| 5,827,559 A | 10/1998 | Powell |
| 5,846,584 A | 12/1998 | Capodieci |
| 5,861,185 A | 1/1999 | Capodieci |
| 5,863,585 A | 1/1999 | Sjöberg |
| 5,871,783 A | 2/1999 | Capodieci |
| 5,871,793 A | 2/1999 | Capodieci |
| 5,914,142 A | 6/1999 | Zartner |
| 5,928,695 A | 7/1999 | Capodieci |
| 6,032,561 A | 3/2000 | Lonn et al. |
| 6,068,868 A | 5/2000 | Capodieci |
| 6,129,940 A * | 10/2000 | Leadbeater .................. 426/512 |
| 6,143,336 A | 11/2000 | Capodieci |
| 6,210,728 B1 | 4/2001 | Capodieci |
| 6,231,330 B1 | 5/2001 | Capodieci |
| 6,318,248 B1 | 11/2001 | Capodieci |
| 6,361,609 B1 | 3/2002 | Ouellette et al. |
| 6,368,647 B1 | 4/2002 | Capodieci |
| 6,403,132 B1 | 6/2002 | Capodieci |
| 6,431,849 B1 | 8/2002 | Capodieci |

FOREIGN PATENT DOCUMENTS

| | | |
|---|---|---|
| DE | 30 34 955 A1 | 3/1982 |
| DE | 88 09 048 | 10/1988 |
| DE | 40 17 363 A1 | 12/1991 |
| DE | 195 05 298 A1 | 8/1996 |
| DE | 197 16 141 A1 | 10/1997 |
| EP | 0 084 903 A2 | 8/1983 |
| EP | 0 333 390 A | 9/1989 |
| EP | 0 478 812 A1 | 4/1992 |
| EP | 0 584 670 | 3/1994 |
| EP | 0 499 647 B1 | 1/1995 |
| EP | 0 561 654 B1 | 1/1996 |
| FR | 2 665 683 A1 | 2/1992 |
| GB | 952 581 | 3/1964 |
| GB | 1 013 665 | 12/1965 |
| GB | 2 117 350 A | 10/1983 |
| GB | 2 171 077 A | 8/1986 |
| GB | 2 219 245 A | 12/1989 |
| GB | 2 276 138 A | 9/1994 |
| GB | 2 283 007 A | 4/1995 |
| JP | 55-154119 | 12/1980 |
| JP | 57-91164 | 6/1982 |
| JP | 63-315223 | 12/1988 |
| JP | 03-158227 | 7/1991 |
| WO | WO 00/20191 | 4/2000 |

* cited by examiner

ULTRASONIC ROTARY FORMING OF FOOD PRODUCTS

BACKGROUND OF THE INVENTION

The present invention generally relates to a system and method of rotary forming food products. In particular, the present invention relates to a system and method of ultrasonically rotary forming food products, such as confectionary.

Millions of pounds of food products such as snack foods, cereals, and pet foods, for example, are purchased and consumed every year. Typically, many of these types of food products are manufactured and sold in the form of small, spherical, bite-sized shapes. For example, many popular snack foods and dry cereals today are packaged and sold in small, bite-sized shapes. Such bite-sized, spherical or pellet shapes may provide for convenient manufacturing and packaging of the food product as well as being easily consumable by consumers. Additionally, dry pet foods, such as dog food, for example, are also typically sold in small, pellet-shaped form. Small, pellet-shaped dry pet foods may also provide convenient manufacturing and packaging of the pet food products as well as being easily consumable by pets.

One method of manufacturing these small, bite-sized, oblong, spherical, or pellet-shaped food products is rotary forming. Rotary forming of food products has been a widely used practice in the field of food product manufacturing for years. Traditionally, rotary forming of food products has typically been accomplished by using one of two types of systems: puddle infeed rotary systems or slab infeed rotary systems. Puddle infeed rotary systems supply "puddles" or droplets of food products to rotary forming wheels. Slab infeed rotary systems provide a continuous slab to the rotary wheels. Each one of these rotary forming systems may present a number of advantages and drawbacks.

Puddle and slab infeed rotary systems typically include a food product input system and a pair of rotary forming wheels. Each of the rotary forming wheels typically includes a number of cavities positioned around the outer edge of each of the rotary forming wheels. The cavities generally extend inward from the outer edge of the rotary forming wheel towards the center of the rotary forming wheel forming a plurality of cavities around the outer edge of the rotary forming wheels. The number of cavities and the size and shape of the cavities of each rotary forming wheel in a pair of rotary forming wheels are typically the same. That is, each cavity on one rotary forming wheel typically has a counterpart of the same shape and size on the other rotary forming wheel in the pair. The number of cavities, as well as the width and depth of the cavities on different pairs of rotary forming wheels may be adjusted depending on the width of the outer edges of the rotary forming wheels and the desired size and depth of a formed food product.

Each rotary forming wheel typically is also similar in size, or is the same size as its counterpart wheel. Further, each wheel is oriented adjacent to its counterpart so that the center point of each rotary forming wheel is along the same horizontal plane. That is, the rotary forming wheels are typically positioned directly adjacent to each other with the outer edges of each of the rotary wheels facing each other. The rotary forming wheels are also typically positioned so that the outer edges of each of the rotary forming wheels are in close proximity to, or touching the other rotary forming wheel.

In addition to the pair of rotary forming wheels, typical infeed rotary systems include a food product input system. The food product input system is typically used to introduce a desired food product into the cavities in the outer edges of the rotary forming wheels. The food product input system may vary depending on the type of food product desired to be introduced into the cavities of the rotary forming wheels. Typically, however, a single tube may be used to deliver food product between a pair of rotary forming wheels. Alternatively, a pair of hollow tubes or a pair of chutes, for example, may be used to deliver the food product to the cavity of the rotary forming wheels. That is, each wheel may be supplied food product by a separate food product delivery tube.

Some infeed rotary systems are configured so that the hollow tubes of the food product input system are positioned above the outer edge of the pair of rotary forming wheels. One end of each of the hollow tubes is typically attached to a food product supply system that supplies the desired food product or products to the infeed rotary system. The end of each of the hollow tubes not attached to the food product supply system is typically positioned in a downward orientation directly over the top of the outer edge of the rotary forming wheels so that one tube is over each rotary forming wheel. That is, the downward end of one tube is positioned over one rotary forming wheel while the downward end of the other tube is positioned over the other forming wheel in the pair.

In operation, the rotary forming wheels typically are rotated in a downward fashion so that the cavities at the top of each of the rotary forming wheels are rotated towards each other. The timing of each of the rotary forming wheels is arranged so that the cavities along the outer edges of each of the rotary forming wheels align with each other at the point where the outer edges of the two rotary forming wheels are positioned closest together or touching. When the cavities of each of the rotary forming wheels align, a hollow mold is formed by the two cavities at the point where the outer edges of the two rotary forming wheels are positioned closest together or touching.

Once the rotary forming wheels are rotated, the food product may be delivered from the food product supply system through the hollow tube, or tubes of the food product input system. The food product supply system typically delivers the food product in a sticky or semi-adhesive state. Due to the orientation of the rotary forming wheels with respect to the hollow tubes, the tubes of the food product input system then may deliver the food product into the upper most cavity of each of the rotary forming wheels. The food product may be continuously supplied (such as in a slab infeed system) or discretely supplied (such as in a puddle infeed system) to the cavities by the food product input system. Once the food product is delivered and fills the upper most cavity of each rotary forming wheel, the rotation of the rotary forming wheels causes the filled cavities to become positioned adjacent to each other forming an enclosed mold as described above. As the cavities of the rotary forming tools filled with food product become aligned adjacent to each other, the close proximity of the rotary forming wheels causes the exposed edges of the food product not bounded by the cavity walls, to come into contact with each other. Typically, the sticky or semi-adhesive properties of the food product cause the contacting exposed edges of food product from each cavity to adhere or "stick together" forming a formed food product.

As the rotary forming wheels continue to rotate downward, the cavities of each rotary forming wheel containing the formed food product begin to separate. Each formed food product is connected to other formed food product through a "web" of food product. That is, a sheet of food product having a plurality of spherical, oblong or pellet shaped protrusions connected through food product webbing is dislodged from the wheels. Once the rotary forming wheels rotate sufficiently so that the cavities of each rotary forming wheel are completely separated, the formed food product included within the food product web typically becomes dislodged, or "falls out" of the rotary forming wheels due to gravity. The falling formed food product web having a plurality of food product protrusions may then received by a conveyor, for example, for further downstream processing, such as separating the individual food product shapes from the food product webbing.

The food product web typically is necessary in order for the food product to dislodge, separate, or otherwise pass from the rotary forming wheels. The weight of the food product web ensures that the food product separates, dislodges, or passes from the wheels. Otherwise, the weight of each individual bite-sized food product is insufficient to dislodge the food product from the cavity and the food product sticks within the cavity, or cavities, of the wheel(s). That is, the food product depends on gravity to dislodge from the wheels. However, the cohesive nature of the food product causes individual food product pellets, or shapes to stick to the cavities. The cohesive force of the individually formed food product with a cavity or cavities typically is greater than the gravitational force generated by the weight of the individually formed food product. Thus, an individually formed food product not connected to other individually formed food product through a web of food product typically sticks to the cavities, or a cavity, of the rotary forming wheel(s). Without a food product web, food product typically sticks within a cavity or cavities the rotary forming wheel(s) and does not dislodge.

The use of the food product web, however, offers disadvantages as well. First, the food product web produces wasted food product material. That is, because the individual bite-sized food product is used in the final product, the webbing that holds the individual pieces together typically is discarded, or recycled after the individual pieces are separated. If the webbing is discarded, the wasted material adds to overall cost of the process. If the webbing is recycled, the process of recycling adds another step to the process of manufacturing individual food product pieces through rotary forming, thereby decreasing the efficiency of the food product manufacturing process.

Thus, a need has existed for a rotary forming food product system that does not utilize a food product web. Further, a need has existed for a more efficient and cost effective system and method of rotary forming food product.

SUMMARY OF THE INVENTION

A system for ultrasonic rotary forming of food products has been developed. The system includes a first ultrasonically activated rotary wheel including a first cavity for receiving a food product and a second rotary wheel. The first ultrasonically activated rotary wheel and said second rotary wheel rotate such that food product within the first cavity contacts the second rotary wheel to form an individually-formed food product. The food product passes from the first cavity upon continued rotation of the wheels. Because the rotary wheel is ultrasonically actuated, food product does not stick in the cavity, even without the use of the food product web. The system also includes a food product delivery system for delivering food product to the first ultrasonically activated rotary wheel and the second rotary wheel. The food product delivery system may include a single food product delivery tube that simultaneously delivers food product from the same stream, slab, puddle, droplet, or line to both rotary wheels. Alternatively, the food product delivery system may include a first hollow tube delivering food product to the first rotary wheel and a second hollow tube delivering food product to the second rotary wheel.

BRIEF DESCRIPTION OF THE DRAWINGS

The foregoing summary, as well as the following detailed description of the preferred embodiments of the present invention, will be better understood when read in conjunction with the appended drawings. For the purpose of illustrating the invention, there is shown in the drawings, embodiments, which are present preferred. It should be understood, however, that the present invention is not limited to the precise arrangements and instrumentality shown in the attached drawings.

DETAILED DESCRIPTION OF THE INVENTION

Figure 4:
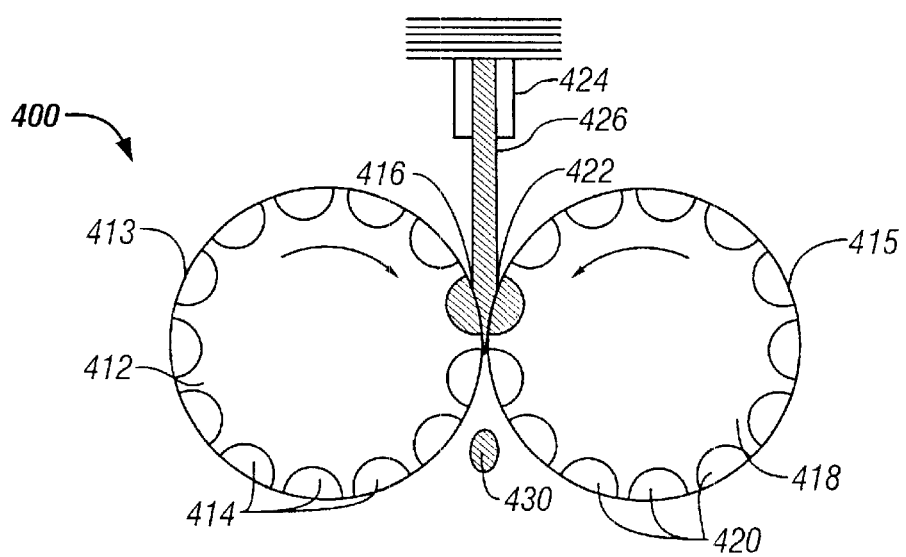
FIG. 4 illustrates an ultrasonic rotary forming system according to a preferred embodiment of the present invention.

FIG. 4 illustrates an ultrasonic rotary forming system 400 according to a preferred embodiment of the present invention. The forming system 400 includes a first ultrasonically activated rotary wheel 412, a second ultrasonically activated rotary wheel 418, a food product delivery tube 424, a stream of food product 426 dispensed from the delivery tube 424 and a single formed food product 430. The first ultrasonically activated rotary wheel 412 includes a plurality of empty cavities 414 and a cavity 416 filled with food product 426. Likewise, the second ultrasonically activated rotary wheel 18 includes a plurality of empty cavities 420 and a cavity 422 filled with food product 426. The empty cavities 414 and 420 and the filled cavities 416 and 422 are located on outer circumferential edges 413 and 415 of the first and second ultrasonically activated rotary wheels 412 and 418, respectively.

The number of cavities 414 and 420 and the size and shape of the cavities 414 and 420 of the wheels 412 and 418 may be adjusted depending on the width of the outer edges 413 and 415 and the desired size, shape, and depth of the formed food product 430. The first and second ultrasonically activated rotary wheels 412 and 418 are each connected to an actuation system (not shown) that rotates the wheels 412 and 418. The rotary forming wheels 412 and 418 are similar in size or are the same size as each other and are oriented adjacent to each other so that the center point of each rotary forming wheel 412 and 418 is along the same horizontal plane. That is, the rotary forming wheels 412 and 418 are positioned directly adjacent to each other with the outer edges 413 and 415 of each of the rotary wheels 412 and 418 facing each other. The rotary forming wheels 412 and 418 are also positioned so that the outer edges 413 and 415 of each of the rotary forming wheels 412 and 418 are in close proximity to or touching each other.

The food product delivery tube 424 is positioned over the juncture of the two wheels 412 and 418, or the point where the wheels 412 and 418 are closest to each other. Preferably, the food delivery tube 424 is positioned such that delivered food product 424 fills the cavities 416 and 422 in equal amounts. The food product delivery tube 424 delivers food product, such as chocolate, that is supplied to the food product delivery tube 424 from a food product delivery system (not shown). The wheels 412 and 418 may be oriented in a vertical or horizontal orientation, with respect to the plane of the floor upon which the system 400 is positioned. If the wheels 412 and 418 are oriented in a horizontal orientation, a conveyor system may be used to convey the food product 426 to and from the wheels 412 and 418. Alternatively, the food product delivery tube 424 may be positioned over the juncture of the two horizontally oriented wheels 412 and 418 and the single food product 430 may drop from the wheels 412 and 418.

In operation, each ultrasonically activated wheel 412 and 418 is rotated such that one of the cavities 414 and one of the cavities 420 align at the point where food product 426 is delivered to the wheels 412 and 418. The rotary forming wheels 412 and 418 are rotated in a downward fashion so that the cavities 414 and 420 at the top of each of the rotary forming wheels 412 and 418 are rotated towards each other. As shown in FIG. 4, the wheel 412 is rotated in a clock-wise fashion while the wheel 418 is rotated in a counter clock-wise direction. The timing of rotation of each of the rotary forming wheels 412 and 418 is arranged so that the cavities 414 and 420 along the outer edges 413 and 415 of each of the rotary forming wheels 412 and 418 align with each other at the point where the outer edges 413 and 415 of the two rotary forming wheels 412 and 418 are positioned closest together or touching. When the cavities of each of the rotary forming wheels 412 and 418 align, a hollow mold is formed by the two cavities 416 and 422 at the point where the outer edges 413 and 415 of the two rotary forming wheels 412 and 418 are positioned closest together or touching.

When the cavities 414 and 420 align, the cavities 414 and 420 receive food product 426. The filled cavities 416 and 422 represent cavities 414 and 420 filled with food product 426. Each cavity 414 and 420 receives food product 426 from the food product delivery tube 424 as the wheels 412 and 418 rotate such that cavities 414 and 420 align with each other. The food product delivery tube 424 simultaneously supplies food product 426 to both wheels 412 and 418 from the same stream, puddle, slab or line of food product 426. The ultrasonic activation of the wheels 412 and 418 acts in conjunction with the edges of the filled cavities 416 and 422, to separate the food product 426 from the steady stream of food product 426 that is supplied from the food product delivery tube 424. That is, the food product 426 is pinched between the ultrasonically activated wheels 412 and 418, and is separated from the stream of food product 426 supplied from the food product delivery tube 424. Thus, the food product 426 breaks off from the stream of supplied food product 426 as it is deposited into the cavities 416 and 422.

The food product delivery system delivers the food product to the wheels 412 and 418 via the food product delivery tube 424 in a sticky or semi-adhesive state. The food product 426 may be continuously supplied or discretely supplied to the cavities 416 and 422 by the food product delivery system. The food product 426 in the filled cavity 416 sticks to, or amalgamates with the food product 426 in the filled cavity 422. Each filled cavity 416 and 422 releases, or passes the single formed food product as the wheels 412 and 418 continue to rotate thereby separating the filled cavities 416 and 422 from each other. The food product 426 does not stick in the filled cavities 416 and 422 because of the ultrasonic activation of the edges of the filled cavities 416 and 422.

The ultrasonic activation of the filled cavities 416 and 422 produces a non-stick surface by which the formed food product 430 passes, or dislodges from the filled cavities 416 and 422. The ultrasonically activated wheels 412 and 418 are ultrasonically activated by methods known in the art, or as described in U.S. Pat. No. 5,871,783 issued to Roberto Capodieci, which is herein incorporated by reference in its entirety. The ultrasonic action facilitates shaping by suitably forming the food product 426 and by preventing the food product 426 from sticking to the ultrasonically activated filled cavities 416 and 422. The ultrasonic energy produced through the ultrasonic activation of the wheels 412 and 418 also vibrates the filled cavities 416 and 422 thereby ensuring the release, or dislodgment, of the formed food product 430 from the filled cavities 416 and 422. That is, the vibration of the wheels 412 and 418 produced through the ultrasonic activation of the wheels 412 and 418 hinders, or eliminates the possibility of the single formed food product 430 sticking to the filled cavities 416 and 422, which become unfilled cavities 414 and 420 as the single formed food product 430 passes from the filled cavities 416 and 422. The single formed food product 430 may then be conveyed to other food product preparation system, such as a coating and/or packaging system.

Figure 1:
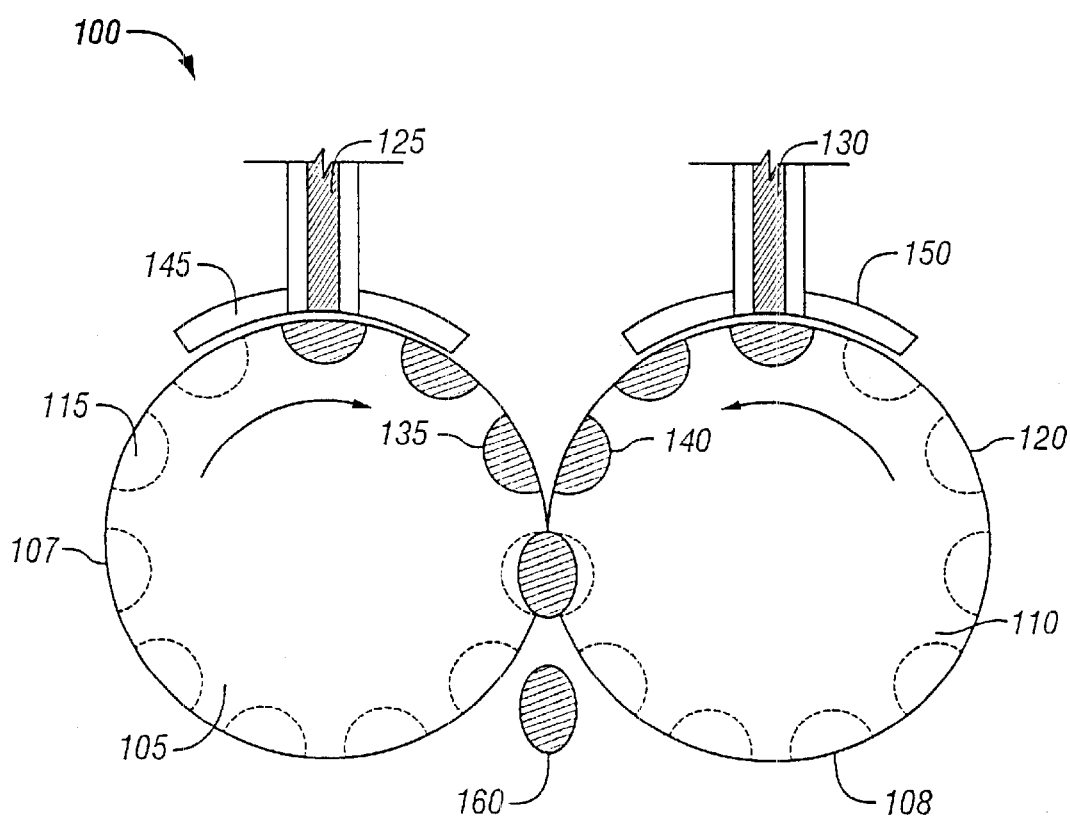
FIG. 1 illustrates an ultrasonic rotary forming system according to an alternative embodiment of the present invention.

FIG. 1 illustrates an ultrasonic rotary forming system 100 according to an alternative embodiment of the present invention. The forming system 100 includes a first ultrasonically activated rotary forming wheel 105, a second ultrasonically activated rotary forming wheel 110, a first food product delivery tube 125, a second food product delivery tube 130, a first wiping shoe 145, a second wiping shoe 150, and a formed food product 160. The first rotary forming wheel 105 further includes an outer edge 107, cavities 115, and filled cavities 135. The second rotary forming wheel 110 further includes an outer edge 108, cavities 120 and filled cavities 140.

The system 100 is set up and operates similarly to the system 400 of FIG. 4. However, instead of a single food delivery tube positioned over the juncture of the two wheels 105 and 110, the first food product delivery tube 125 is positioned over the first wheel 105 and the second food product delivery tube 130 is positioned over the second wheel 110. That is, the wheels 105 and 110 do not receive food product from the same food product stream as in FIG. 4. Rather, each wheel 105 and 110 receives food product from separate food product streams. Additionally, the first wiping shoe 145 is positioned around a portion of the first wheel 105 and the second shoe 150 is positioned around a portion of the second wheel 110. The first and second wiping shoes 145 and 150 wipe excess food product from the edges 107 and 108 of the wheels 105 and 110.

In operation, the rotary forming wheels 105 and 110 typically are rotated in a downward fashion so that the cavities 135 and 140 at the top of each of the rotary forming wheels are rotated towards each other. The timing of each of the rotary forming wheels 105 and 110 is arranged so that the cavities 135 and 140 along the outer edges 107 and 108 of each of the rotary forming wheels 105 and 110 align with each other at the point where the outer edges 107 and 108 of the two rotary forming wheels 105 and 110 are positioned closest together or touching. When the cavities 135 and 140 of each of the rotary forming wheels align 105 and 110, a hollow mold is formed by the two cavities 135 and 140 at the point where the outer edges 107 and 108 of the two rotary forming wheels 105 and 110 are positioned closest together or touching.

Once the rotary forming wheels 105 and 110 are rotated, the food product may be delivered from the food product supply system through the hollow tubes 125 and 130 of the food product supply system. The food product supply system typically delivers the food product in a sticky or semi-adhesive state. Due to the orientation of the rotary forming wheels 105 and 110 with respect to the hollow tubes 125 and 130, the tubes 125 and 130 of the food product supply system may then deliver the food product into the upper most cavity 135 or 140 of each of the rotary forming wheels 105 and 110. The food product may be continuously supplied or discretely supplied to the cavities by the food product supply system.

Once the food product is delivered and fills the upper most cavities 135 and 140 of each rotary forming wheel 105 and 110, creating a "puddle" of food product in the cavities 135 and 140, the rotation of the rotary forming wheels 105 and 110 causes the filled cavities 135 and 140 to become positioned adjacent to each other forming an enclosed mold. As the filled cavities 135 and 140 of the rotary forming wheels 105 and 110 align adjacent to each other, the close proximity of the rotary forming wheels 105 and 110 causes the exposed edges of the food product not bounded by the cavity walls, to come into contact with each other. As mentioned above, the first and second wiping shoes 145 and 150 wipe excess food product from the edges 107 and 108 of the wheels 105 and 110. The wiping shoes 145 and 150 ensure that the cavities 135 and 140 do not contain too much food product.

The food product in the filled cavity 135 sticks to, or amalgamates with the food product in the filled cavity 140. Each filled cavity 135 and 140 releases, or passes the single formed food product 160 as the wheels 105 and 110 continue to rotate thereby separating the filled cavities 135 and 140 from each other. The food product does not stick in the filled cavities 135 and 140 because of the ultrasonic activation of the edges of the filled cavities 135 and 140.

The ultrasonic activation of the filled cavities 135 and 140 produces a non-stick surface by which the formed food product 160 passes, or dislodges from the filled cavities 135 and 140. Similar to FIG. 1, the ultrasonically activated wheels 105 and 110 are ultrasonically activated by methods known in the art, or as described in U.S. Pat. No. 5,871,783 issued to Roberto Capodieci, which is herein incorporated by reference in its entirety. The ultrasonic action facilitates shaping by suitably forming the food product and by preventing the food product from sticking to the ultrasonically activated filled cavities 135 and 140. The ultrasonic energy produced through the ultrasonic activation of the wheels 105 and 110 also vibrates the filled cavities 135 and 140 thereby ensuring the release, or dislodgment, of the formed food product 160 from the filled cavities 135 and 140. That is, the vibration of the wheels 135 and 140 produced through the ultrasonic activation of the wheels 105 and 110 hinders, or eliminates the possibility of the single formed food product 160 sticking to the filled cavities 135 and 140, which become unfilled cavities 115 and 120 as the single formed food product 30 passes from the filled cavities 135 and 140. The single formed food product 160 may then be conveyed to other food product preparation system, such as a coating and/or packaging system.

Figure 2:
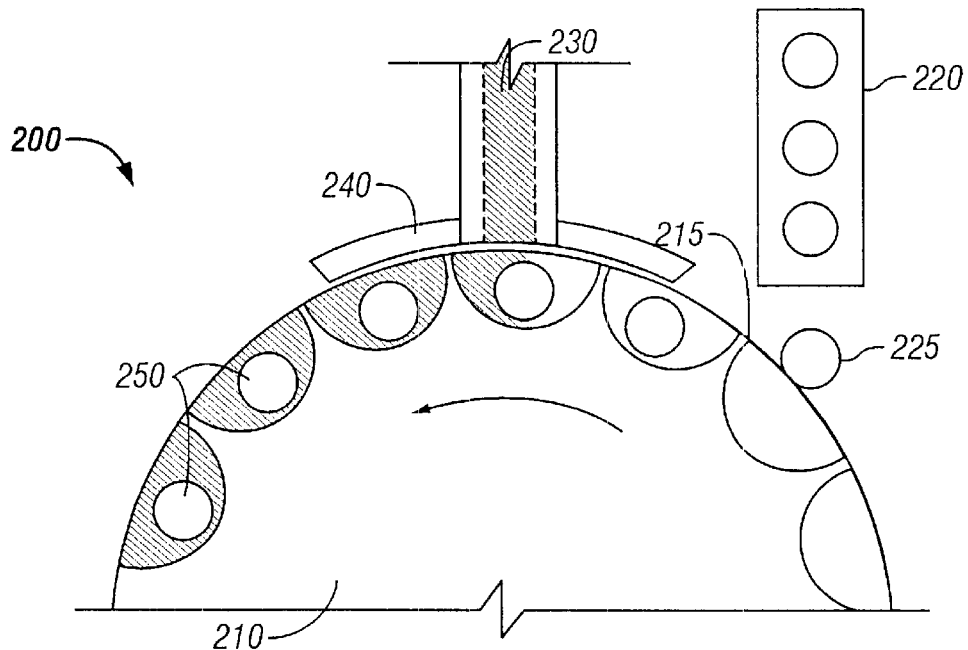
FIG. 2 illustrates an inclusion delivery system according to an embodiment of the present invention.

FIG. 2 illustrates an inclusion delivery system 200 according to an embodiment of the present invention. The system 200 includes an inclusion delivery tube 220, an ultrasonically activated rotary wheel 210 (only one wheel shown), a plurality of inclusions 225, such as nuts or pieces of nougat, cavities 215, a food product delivery tube 230, a wiping shoe 240, and food product and inclusion-filled cavities 250. As shown in FIG. 2, the inclusion delivery system 200 is shown with the food product delivery tube 230 located over the wheel 210. However, the inclusion delivery system 200 may also be used with the system 400 of FIG. 4.

In operation, the inclusion delivery tube 220 deposits an inclusion, such as a nut or piece of nougat, into a cavity 215. The wheel 210 is rotated such that the cavity 215 with the inclusion 225 progresses toward the food product delivery tube 230. The food product delivery tube 230 then deposits food product into the cavity 215 thereby forming a food product and inclusion-filled cavity 250. The rotation of the wheel 210 causes the food product and inclusion-filled cavity 250 to align with a filled cavity (not shown) or another food product and inclusion-filled cavity (not shown) of another ultrasonically activated rotary wheel (not shown) where the food product forming process described above occurs.

Alternatively, with respect to FIGS. 1–2 and 4, one of the rotary wheels may be an ultrasonically activated rotary wheel having cavities while the other wheel may be a rotary wheel having a smooth circumferential edge without any cavities. The wheel with the smooth circumferential edge may or may not be ultrasonically activated. However, the wheel with cavities is ultrasonically activated. In operation, food product is deposited into the cavities of the ultrasonically activated wheel. The wheels are rotated such that food product in a cavity contacts the wheel with the smooth circumferential edge. A single formed food product is dislodged from the cavity, due to the ultrasonic activation of the ultrasonically activated rotary wheel, when the rotation of the wheels causes the filled cavity to separate from the wheel having the smooth circumferential edge. Because the wheel having the smooth circumferential edge does not have any cavity or recess into which food product may be deposited, the weight of the food product may cause the formed food product to separate from the wheel having the smooth circumferential edge even if that wheel is not ultrasonically activated.

Figure 3:
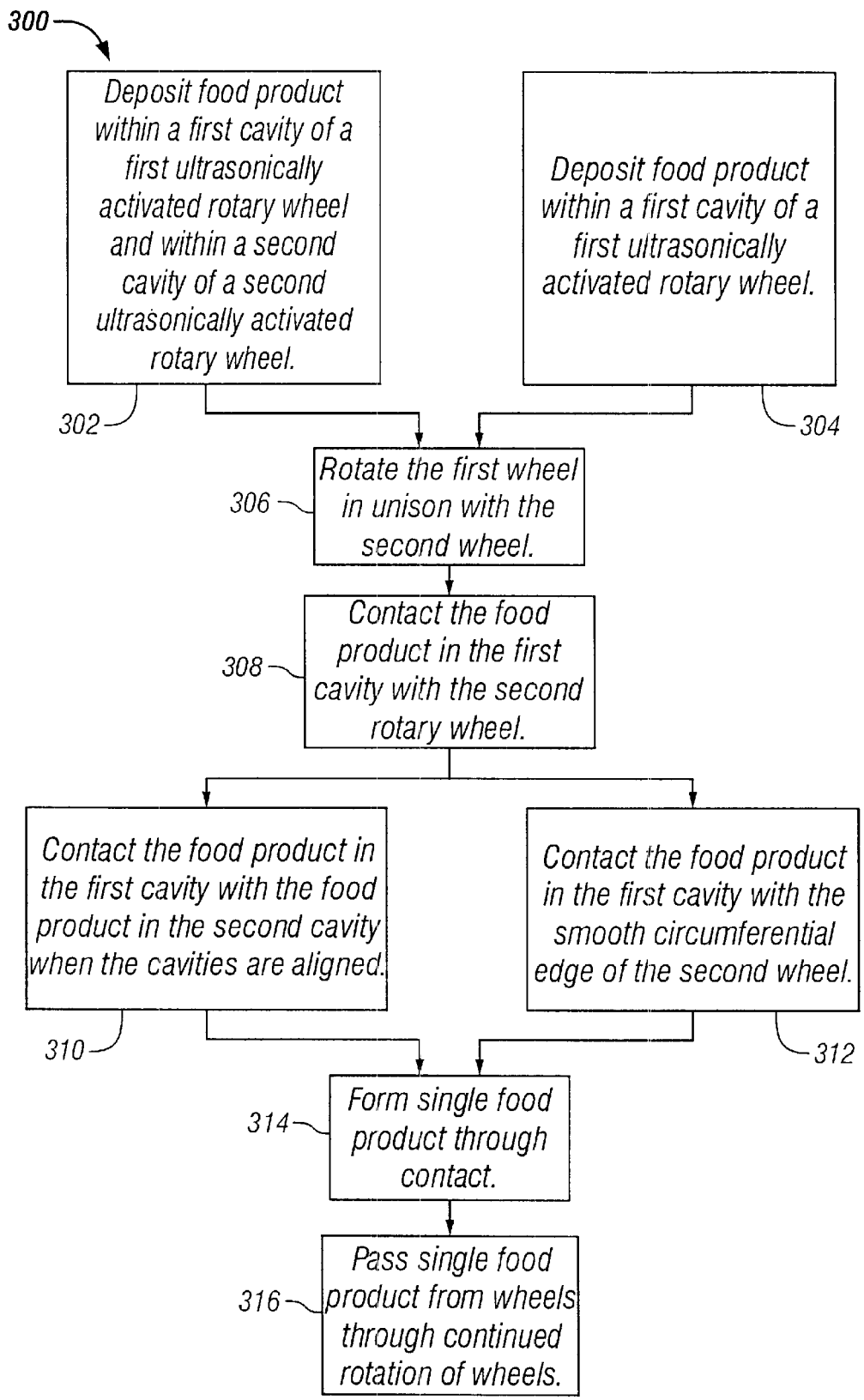
FIG. 3 is a flow chart of methods of ultrasonically rotary forming a food product according to embodiments of the present invention.

FIG. 3 is a flow chart 300 of methods of ultrasonically rotary forming a food product according to embodiments of the present invention. At step 302, food product is deposited into a first cavity of a first ultrasonically activated rotary wheel. Also, at step 302, food product is deposited into a second cavity of a second ultrasonically activated rotary wheel. Alternatively, at step 304, if the second wheel has a smooth circumferential edge, food product may be deposited within a first cavity of a first ultrasonically activated wheel.

Next, at step 306, the first wheel and second wheel are rotated in unison with another such that the food product in the first cavity (and in the second cavity) is rotated toward the point where the wheels are closest to, or touching one another. At step 308, when the wheels are closest to, or touching one another, the food product in the first cavity contacts the second rotary wheel. At step 310, the food product in the first cavity contacts the food product in the second cavity when the cavities are aligned. Alternatively, at step 312, the food product in the first cavity contacts the smooth circumferential edge of the second wheel. The contacting steps 310 or 312, form a single food product at step 314. At step 316, the continued rotation of the wheels and ultrasonic activation of at least one of the wheels causes the single formed food product to pass, or dislodge, from the wheels.

Therefore, embodiments of the present invention provide a system and method of rotary forming individually formed food product without a food product web. Because the present invention does not utilize a food product web to dislodge food product from cavities of the rotary forming wheels, the present invention provides a more efficient and cost-effective system and method as compared to prior systems and method of rotary forming food products.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications that incorporate those features coming within the scope of the invention.

What is claimed is:

1. A system for ultrasonic rotary forming of food products, said system including:
   a first ultrasonically activated rotary wheel including a first cavity for receiving a food product; and
   a second rotary wheel, said first ultrasonically activated rotary wheel and said second rotary wheel rotating such that food product within said first cavity contacts said second rotary wheel to form a food product.

2. The system of claim 1 wherein said food product dislodges from said first cavity upon continued rotation of said first ultrasonically activated rotary wheel and said second rotary wheel.

3. The system of claim 1 wherein said second rotary wheel is an ultrasonically activated rotary wheel including a second cavity for receiving food product, said first ultrasonically activated rotary wheel and said second ultrasonically activated rotary wheel rotating such that food product within said first cavity contacts food product within said second cavity to form said food product.

4. The system of claim 1 further including a food product delivery system for delivering food product to said first ultrasonically activated rotary wheel and said second rotary wheel.

5. The system of claim 1 wherein said second rotary wheel is an ultrasonically activated rotary wheel.

6. The system of claim 1 wherein said second rotary wheel has a smooth circumferential edge.

7. The system of claim 1 further including a food product delivery system wherein said food product delivery system is comprised of a first tube delivering a food product to said first ultrasonically activated rotary wheel and a second tube delivering a food product to said second rotary wheel.

8. The system of claim 1 further including a food product delivery system wherein said food product delivery system is comprised of a food product delivery tube delivering a food product to said first ultrasonically activated rotary wheel and to said second rotary wheel.

9. The system of claim 1 further including a first wiping shoe for wiping excess food product from an outer edge of said first ultrasonically activated rotary wheel and a second wiping shoe for wiping excess food product from an outer edge of said second rotary wheel.

10. The system of claim 1 further including an inclusion delivery system for providing an edible inclusion to said first cavity of said first ultrasonically activated rotary wheel.

11. The system of claim 1 further including an inclusion delivery system for providing an edible inclusion to said first cavity, and for providing an edible inclusion to said second cavity.

12. The system of claim 1 wherein said first ultrasonically activated rotary wheel includes a plurality of cavities for receiving food product, and wherein said second rotary wheel is a second ultrasonically activated rotary wheel including a plurality of cavities for receiving food product.

13. A system for ultrasonic rotary forming of food products, said system including:
   a first ultrasonically activated rotary wheel including a first cavity for receiving a food product;
   a second rotary wheel, said first ultrasonically activated rotary wheel and said second rotary wheel rotating such that food product within said first cavity contacts said second rotary wheel to form an individually-formed food product;
   a food product delivery system for delivering food product to said first ultrasonically activated rotary wheel and said second rotary wheel; and
   an inclusion delivery system for providing an edible inclusion to said first cavity of said first ultrasonically activated rotary wheel.

14. The system of claim 13 wherein said food product is ejected from said first cavity upon continued rotation of said first ultrasonically activated rotary wheel and said second rotary wheel.

15. The system of claim 13 wherein said second rotary wheel is an ultrasonically activated rotary wheel including a second cavity for receiving food product, wherein said first ultrasonically activated rotary wheel and said second ultrasonically activated rotary wheel rotate such that food product within said first cavity contacts food product within said second cavity to form a single food product, and wherein said inclusion delivery system provides an edible inclusion to said second cavity of said second ultrasonically activated rotary wheel prior to said first cavity contacting said second cavity.

16. The system of claim 13 wherein said second rotary wheel has a smooth circumferential edge.

17. The system of claim 13 wherein said food product delivery system includes a hollow tube delivering a food product to said first ultrasonically activated rotary wheel and a hollow tube delivering a food product to said second rotary wheel.

18. The system of claim 13 wherein said food product delivery system includes a food product delivery tube delivering a food product to said first ultrasonically activated rotary wheel and to said second rotary wheel.

19. The system of claim 13 further including a first wiping shoe for wiping excess food product from an outer edge of said first ultrasonically activated rotary wheel and a second wiping shoe for wiping excess food product from an outer edge of said second rotary wheel.

20. The system of claim 13 wherein said first ultrasonically activated rotary wheel includes a plurality of cavities for receiving food product, and wherein said second rotary wheel is a second ultrasonically activated rotary wheel including a plurality of cavities for receiving food product.

21. A system for ultrasonic rotary forming of food products, said system including:
   a first ultrasonically activated rotary wheel including a first cavity for receiving a food product; and
   a second ultrasonically activated rotary wheel including a second cavity for receiving food product, said first ultrasonically activated rotary wheel and said second ultrasonically activated rotary wheel rotating such that food product within said first cavity contacts food product within said second cavity to form a single food product.

22. The system of claim 21 wherein said single food product is ejected from said first and second cavities upon continued rotation of said first and second ultrasonically activated rotary wheels.

23. The system of claim 21 further including a food product delivery system for delivering food product to said first ultrasonically activated rotary wheel and said second ultrasonically activated rotary wheel.

24. The system of claim 21 further including a food product delivery system wherein said food product delivery system is comprised of a first hollow tube delivering a food product to said first ultrasonically activated rotary wheel and a second hollow tube delivering a food product to said second ultrasonically activated rotary wheel.

25. The system of claim 21 further including a food product delivery system wherein said food product delivery system is comprised of a food product delivery tube delivering a food product to said first ultrasonically activated rotary wheel and to said second rotary wheel.

26. The system of claim 21 further including a first wiping shoe for wiping excess food product from an outer edge of said first ultrasonically activated rotary wheel and a second wiping shoe for wiping excess food product from an outer edge of said second ultrasonically activated rotary wheel.

27. The system of claim 21 further including an inclusion delivery system for providing an edible inclusion to said first cavity, and for providing an edible inclusion to said second cavity.

28. The system of claim 21 wherein said first ultrasonically activated rotary wheel includes a plurality of cavities for receiving food product, and said second ultrasonically activated rotary wheel includes a plurality of cavities for receiving food product.

29. A method of ultrasonically rotary forming food products, said method including:
depositing food product within a first cavity of a first ultrasonically activated rotary wheel;
rotating the first ultrasonically activated rotary wheel in conjunction with a second rotary wheel; and
contacting the food product in the first cavity with the second rotary wheel to form a food product.

30. The method of claim 29 further including passing the single food product from the first ultrasonically activated rotary wheel and the second rotary wheel upon continued rotation of the first ultrasonically activated rotary wheel and the second rotary wheel.

31. The method of claim 29 further including:
ultrasonically activating the second rotary wheel; and
depositing food product within a second cavity of the second rotary wheel,
wherein said contacting step includes contacting the food product within the first cavity with the food product within the second cavity to form a single food product.

32. The method of claim 29 further including ultrasonically activating the second rotary wheel.

33. The method of claim 29 further including forming a smooth circumferential edge on the second rotary wheel.

34. The method of claim 29 further including delivering food product to the first ultrasonically activated rotary wheel with a first tube and delivering food product to the second rotary wheel with a second tube.

35. The method of claim 29 further including delivering food product to the first ultrasonically activated rotary wheel and the second rotary wheel with a food product delivery tube.

36. The method of claim 29 further including wiping excess food product from an outer edge of said first ultrasonically activated rotary wheel with a first wiping shoe and wiping excess food product from an outer edge of said second rotary wheel with a second wiping shoe.

37. The method of claim 29 further including providing an edible inclusion to the first cavity of the first ultrasonically activated rotary wheel prior to said contacting step.

38. The method of claim 31 further including providing an edible inclusion to the first cavity, and providing an edible inclusion to the second cavity prior to said contacting step.

39. A method of ultrasonically rotary forming food products, said method including:
depositing food product within a first cavity of a first ultrasonically activated rotary wheel;
depositing food product within a second cavity of a second ultrasonically activated rotary wheel;
rotating the first ultrasonically activated rotary wheel in conjunction with the second ultrasonically activated rotary wheel; and
contacting the food product in the first cavity with the food product in the second cavity of the second ultrasonically activated rotary wheel to form a food product.

40. The method of claim 39 further including dislodging the food product from the first ultrasonically activated rotary wheel and the second rotary wheel upon continued rotation of the first ultrasonically activated rotary wheel and the second rotary wheel.

41. The method of claim 39 further including delivering food product to the first ultrasonically activated rotary wheel with a first tube and delivering food product to the second rotary wheel with a second tube.

42. The method of claim 39 further including delivering food product to the first ultrasonically activated rotary wheel and the second rotary wheel with a food product delivery tube.

43. The method of claim 39 further including wiping excess food product from an outer edge of said first ultrasonically activated rotary wheel with a first wiping shoe and wiping excess food product from an outer edge of said second rotary wheel with a second wiping shoe.

44. The method of claim 39 further including providing an edible inclusion to the first cavity of the first ultrasonically activated rotary wheel prior to said contacting step.

45. The method of claim 39 further including providing an edible inclusion to the first cavity, and providing an edible inclusion to the second cavity prior to said contacting step.

46. The system of claim 13 wherein said food product is ejected from said first cavity at a predetermined rotational orientation of said first ultrasonically activated rotary wheel and said second rotary wheel.

47. The system of claim 21 wherein said single food product is ejected from said first and second cavities at a predetermined rotational orientation of said first and second ultrasonically activated rotary wheels.

* * * * *